United States Patent
De Jager

[11] 3,862,796
[45] Jan. 28, 1975

[54] PLASTIC-GLASS EYELOUPE

[75] Inventor: Donald De Jager, Rochester, N.Y.

[73] Assignee: Eastman Kodak Company, Rochester, N.Y.

[22] Filed: Apr. 24, 1973

[21] Appl. No.: 354,047

[52] U.S. Cl........ 350/216, 350/175 E, 350/175 NG, 350/223
[51] Int. Cl........ G02b 9/60, G02b 3/60, G02b 9/34
[58] Field of Search.. 350/216, 223, 175 E, 175 NG

[56] References Cited
UNITED STATES PATENTS
| | | | |
|---|---|---|---|
| 2,600,805 | 6/1952 | Reiss | 350/216 |
| 3,516,735 | 6/1970 | Goodell | 350/175 NG |

FOREIGN PATENTS OR APPLICATIONS
| | | | |
|---|---|---|---|
| 931,063 | 7/1963 | Great Britain | 350/216 |
| 1,250,151 | 9/1967 | Germany | 350/216 |

*Primary Examiner*—Paul A. Sacher
*Attorney, Agent, or Firm*—R. F. Brothers

[57] ABSTRACT

A five-element eyeloupe lens comprising a first meniscus positive element, a second meniscus negative element, a third biconvex positive element, a fourth biconcave negative element and a fifth positive element which may be either biconvex or meniscus. Preferably, the first, second, fourth and fifth elements are made of a low-cost, lightweight plastic, while the third element is made of a low-cost glass.

4 Claims, 2 Drawing Figures

3,862,796

PLASTIC-GLASS EYELOUPE

BACKGROUND OF THE INVENTION

1. Field of the Invention

The present invention relates generally to an optical lens system and in particular to an optical eyeloupe.

2. Description of the Prior Art

Many optical systems require the use of an eyeloupe to increase the angular size of a small object. For example, a night vision device forms an image on a phosphor screen which is too small for convenient viewing with the unaided eye. An eyeloupe is incorporated into this system to present an enlarged virtual image to the eye. Presently available eyeloupes for use in such a system have been made of all glass elements. These eyeloupes are relatively costly to produce and, in addition, are relatively heavy in weight.

SUMMARY OF THE INVENTION

Accordingly, it is an object of the present invention to provide an improved eyeloupe.

A further object of the present invention is to provide such an eyeloupe which is inexpensive to manufacture.

It is a further object of the present invention to provide such an eyeloupe which is lightweight.

Still another object of the present invention is to provide such an eyeloupe having a focal length which is relatively insensitive to changes in temperature or humidity.

Still a further object of the present invention is to provide such an eyeloupe which is well corrected and may be used to magnify the image produced by an image intensifier tube in a night vision device.

These and other objects are accomplished by the present invention in which an optical eyeloupe is provided which comprises five elements, a first meniscus positive element, a second meniscus negative element, a third biconvex positive element, a fourth biconcave negative element and a fifth positive element which may be either biconvex or meniscus. In the preferred embodiments, the first, second, fourth and fifth elements are made of a low-cost, lightweight plastic material, while the third element is made of a low-cost glass.

BRIEF DESCRIPTION OF THE DRAWINGS

In the detailed description of the preferred embodiments of this invention presented below, reference is made to the accompanying drawings in which.

DESCRIPTION OF THE PREFERRED EMBODIMENTS

Figure 1:
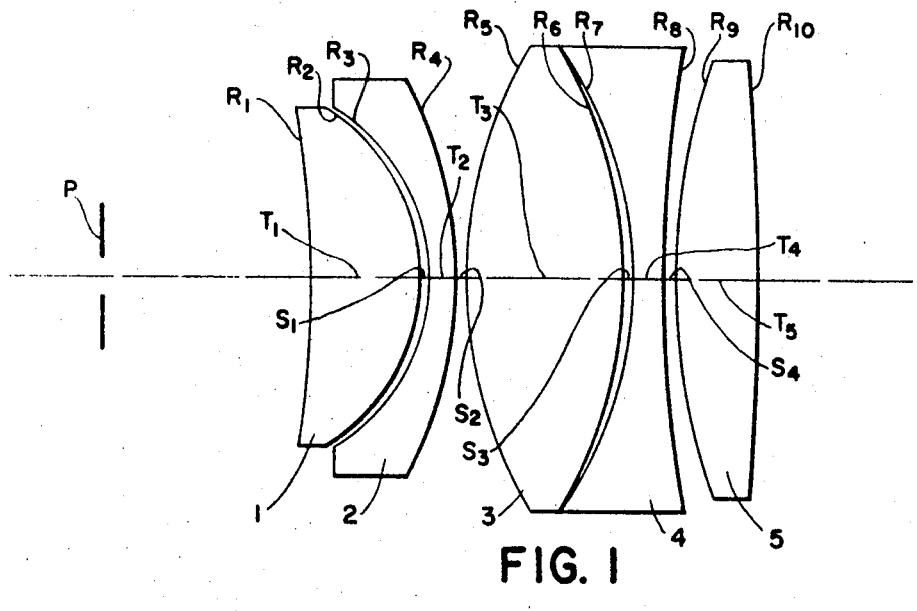
FIG. 1 is a schematic representation of one embodiment of the present invention.
Figure 2:
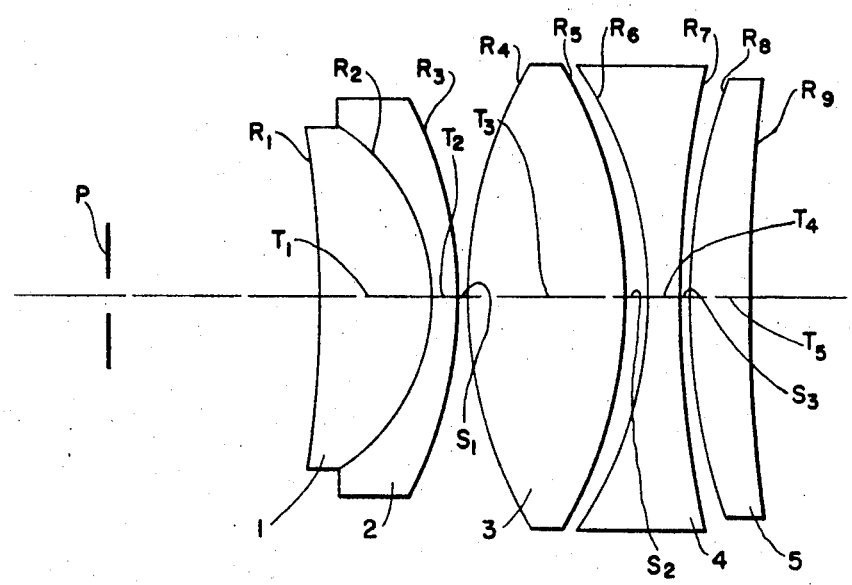
FIG. 2 is a schematic representation of an alternate embodiment of the present invention.

For all purposes of describing or claiming of the invention herein, the term lens will be used to describe the complete lens and not the elements thereof. In FIGS. 1 and 2, the elements are numbered from left to right with Arabic numerals, with the left side considered the front of the lens. In the Examples, the elements, the indices of refraction and Abbe numbers V for the 0.5893 micron Sodium line of the spectrum, the radii of curvature R, the thicknesses T and the airspaces S are numbered by subscript to correspond with FIGS. 1 and 2. Radii of curvature having centers to the right of the surface are considered positive; those with centers of curvature to the left of the surface are considered negative. All parameters are based upon a lens equivalent focal length of (100) millimeters.

In all embodiments of the invention as illustrated in FIGS. 1 and 2, the lens comprises five elements. Element 1 is a front positive meniscus element, concave to the front. Element 2 is a front negative meniscus element, concave to the front Element 3 is a positive biconvex element. Element 4 is a rear negative biconcave element. Element 5 is a rear positive element, which is biconvex in Example 1 and is meniscus in Example 2, concave to the rear.

Lenses may be made according to this invention by following the specifications of the preferred embodiments presented below. The lens illustrated in FIG. 1 has the following parameters.

Example 1

| Element | Radius(mm) | Thickness/Air space mm | $N_D$ | V |
|---|---|---|---|---|
| | | F=100mm  Eye relief=73.83  Angular field=46.5° | | |
| 1 | $R_1 = -442.44$ | $T_1 = 29.533$ | 1.49168 | 57.4 |
| | $R_2 = -50.960$ | $S_1 = 0.738$ | | |
| 2 | $R_3 = -50.960$ | $T_2 = 8.860$ | 1.59028 | 30.9 |
| | $R_4 = -106.74$ | $S_2 = 1.477$ | | |
| 3 | $R_5 = 107.94$ | $T_3 = 42.144$ | 1.61100 | 58.8 |
| | $R_6 = -107.94$ | $S_3 = 1.004$ | | |
| 4 | $R_7 = -103.04$ | $T_4 = 8.860$ | 1.59028 | 30.9 |
| | $R_8 = 427.94$ | $S_4 = 1.476$ | | |
| 5 | $R_9 = 165.58$ | $T_5 = 21.618$ | 1.49168 | 57.4 |
| | $R_{10} = -942.14$ | | | |

Four of the elements in the lens of Example 1 are made of low-cost lightweight, plastic materials. Elements 1 and 5 are made of polymethyl methacrylate and elements 2 and 4 are made of polystyrene. Elements made of such materials may be formed by injection molding techniques, which are well known. It was found that best results were achieved using a higher index material in the positive central element and accordingly, element 3 is made of a dense barium crown glass.

The lens illustrated in FIG. 2 has the following parameters.

Example 2

| F=100mm | Eye relief=73.83 | | Angular field= 46.5° | |
|---|---|---|---|---|
| Element | Radius(mm) | Thickness/Air space mm | $N_D$ | V |
| 1 | $R_1= -292.57$ | $T_1=29.220$ | 1.49168 | 57.4 |
|   | $R_2= -51.237$ | | | |
| 2 | | $T_2=8.860$ | 1.59028 | 30.9 |
|   | $R_3= -93.124$ | | | |
|   | | $S_1=1.477$ | | |
|   | $R_4=106.74$ | | | |
| 3 | | $T_3=42.203$ | 1.61100 | 58.8 |
|   | $R_5= -106.74$ | | | |
|   | | $S_2=0.791$ | | |
|   | $R_6= -103.66$ | | | |
| 4 | | $T_4=8.860$ | 1.59028 | 30.9 |
|   | $R_7=250.96$ | | | |
|   | | $S_3=1.477$ | | |
|   | $R_8=123.82$ | | | |
| 5 | | $T_5=21.790$ | 1.49168 | 57.4 |
|   | $R_9=1059.8$ | | | |

The lens of Example 2 is similar to that of Example 1, with the same materials used for corresponding elements. The differences are that, in the lens of Example 2, elements 1 and 2 are cemented together and element 5 is meniscus in shape, concave to the rear. Once again, best performance is achieved when the central positive element is made of a higher index material, namely dense barium crown glass. The other four elements are made of low-cost lightweight plastic materials, which are adaptable to injection molding techniques, thereby reducing the cost of manufacture and the weight of the optical system.

As noted above, best results were achieved when the middle element was made of glass. This choice also resulted in a lens which, even though containing four plastic elements, was relatively insensitive to changes in temperature. As may be seen from the lens parameters, most of the power of the lens is derived from the middle glass element with the four plastic elements providing primarily aberration corrections. Since glass is relatively stable in index of refraction with change in temperature, the overall focal length and back focal length of the lens are also relatively insensitive to temperature changes. Using the thermal coefficients of expansion and the thermal coefficients of the indices of refraction, the predicted changes in focal length or in back focal length are on the order of 0.1 percent or less, for a 50° C change in temperature. Actual tests from room temperature to −80° F have shown that focus changes are indeed negligible.

Additional lenses have been designed which are similar to Example 2, but with element 5 being biconvex. Each of these lenses is characterized by eye relief which is equal to 27 mm. These lenses may be made by following the specifications presented in the following three examples.

Example 3

| F=27mm | | | Angular field=40° | |
|---|---|---|---|---|
| Element | Radius(mm) | Thickness/Air space mm | $N_D$ | V |
| 1 | $R_1=45.0899$ | $T_1=10.774$ | 1.49168 | 57.4 |
|   | $R_2= -18.4960$ | | | |
| 2 | | $T_2=2.230$ | 1.59028 | 30.9 |
|   | $R_3= -132.634$ | | | |
|   | | $S_1=.500$ | | |
|   | $R_4=34.5780$ | | | |
| 3 | | $T_3=13.017$ | 1.61100 | 58.8 |
|   | $R_5= -32.0830$ | | | |
|   | | $S_2=.605$ | | |
|   | $R_6= -29.9590$ | | | |
| 4 | | $T_4=2.515$ | 1.59028 | 30.9 |
|   | $R_7= -2445.05$ | | | |
|   | | $S_3=.500$ | | |
|   | $R_8=33.0678$ | | | |
| 5 | | $T_5=5.784$ | 1.49168 | 57.4 |
|   | $R_9= -151.270$ | | | |

Example 4

F=27mm, Angular field=40°

| Element | Radius(mm) | Thickness/Air space mm | $N_D$ | V |
|---|---|---|---|---|
| 1 | $R_1$=45.0900 | $T_1$=10.774 | 1.49168 | 57.4 |
| 2 | $R_2$=−18.4943 | $T_2$=2.230 | 1.59028 | 30.9 |
|   | $R_3$=−132.634 | $S_1$=.500 | | |
| 3 | $R_4$=34.5780 | $T_3$=10.500 | 1.61100 | 58.8 |
|   | $R_5$=−34.5780 | $S_2$=.626 | | |
| 4 | $R_6$=−32.3470 | $T_4$=2.126 | 1.59028 | 30.9 |
|   | $R_7$=−297.178 | $S_3$=2.127 | | |
| 5 | $R_8$=35.1890 | $T_5$=5.727 | 1.49168 | 57.4 |
|   | $R_9$=−264.490 | | | |

Example 5

F=27mm, Angular field=40°

| Element | Radius(mm) | Thickness/Air space mm | $N_D$ | V |
|---|---|---|---|---|
| 1 | $R_1$=45.0764 | $T_1$=10.774 | 1.49168 | 57.4 |
| 2 | $R_2$=−18.4943 | $T_2$=2.230 | 1.59028 | 30.8 |
|   | $R_3$=−132.634 | $S_1$=.500 | | |
| 3 | $R_4$=34.5588 | $T_3$=10.500 | 1.61100 | 58.8 |
|   | $R_5$=−34.5588 | $S_2$=.617 | | |
| 4 | $R_6$=−32.3442 | $T_4$=1.990 | 1.59028 | 30.9 |
|   | $R_7$=−297.178 | $S_3$=2.260 | | |
| 5 | $R_8$=35.1825 | $T_5$=5.673 | 1.49168 | 57.4 |
|   | $R_9$=−264.490 | | | |

This invention has been described in detail with particular reference to the preferred embodiments thereof, but it will be understood that variations and modifications can be effected within the spirit and scope of the invention.

I claim:

1. A lens consisting of five elements, said elements being, from front to rear, a first positive meniscus element concave to the front, a second negative meniscus element concave to the front, a third positive biconvex element, a fourth negative biconcave element and a fifth positive biconvex element, wherein at least said first, second, fourth and fifth elements are made of plastic.

2. A lens according to claim 1, wherein said lens has a focal length of (100) millimeters when constructed according to the parameters in the following table:

| Element | Radius(mm) | Thickness/Air space mm | $N_D$ | V |
|---|---|---|---|---|
| 1 | $R_1$=−292.57 | $T_1$=29.220 | 1.49168 | 57.4 |
| 2 | $R_2$=−51.237 | $T_2$=8.860 | 1.59028 | 30.9 |
|   | $R_3$=−93.124 | $S_1$=1.477 | | |
| 3 | $R_4$=106.74 | $T_3$=42.203 | 1.61100 | 58.8 |
|   | $R_5$=−106.74 | $S_2$=0.791 | | |
| 4 | $R_6$=−103.66 | $T_4$=8.860 | 1.59028 | 30.9 |
|   | $R_7$=250.96 | $S_3$=1.477 | | |
| 5 | $R_8$=123.82 | $T_5$=21.790 | 1.49168 | 57.4 |
|   | $R_9$=1059.8 | | | | wherein, from front to rear, the lens elements are numbered from one to five, the corresponding indices of refraction, N, and Abbe numbers, V, are for the 0.5893 micron Sodium line of the spectrum, the radii are numbered from $R_1$ to $R_9$, the thicknesses are numbered from $T_1$ to $T_5$, and the air spaces are numbered from $S_1$ to $S_3$.

3. A lens according to claim 1, wherein said lens has a focal length of (100) millimeters when constructed according to the parameters in the following table:

| Element | Radius(mm) | Thickness/Air space mm | $N_D$ | V |
|---|---|---|---|---|
| 1 | $R_1 = -442.44$ | | | |
|  |  | $T_1 = 29.533$ | 1.49168 | 57.4 |
|  | $R_2 = -50.960$ | | | |
|  |  | $S_1 = 0.738$ | | |
|  | $R_3 = -50.960$ | | | |
| 2 |  | $T_2 = 8.860$ | 1.59028 | 30.9 |
|  | $R_4 = -106.74$ | | | |
|  |  | $S_2 = 1.477$ | | |
|  | $R_5 = 107.94$ | | | |
| 3 |  | $T_3 = 42.144$ | 1.61100 | 58.8 |
|  | $R_6 = -107.94$ | | | |
|  |  | $S_3 = 1.004$ | | |
|  | $R_7 = -103.04$ | | | |
| 4 |  | $T_4 = 8.860$ | 1.59028 | 30.9 |
|  | $R_8 = 427.94$ | | | |
|  |  | $S_4 = 1.476$ | | |
|  | $R_9 = 165.58$ | | | |
| 5 |  | $T_5 = 21.618$ | 1.49168 | 57.4 |
|  | $R_{10} = -942.14$ | | | | wherein, from front to rear, the lens elements are numbered from one to five, the corresponding indices of refraction, N, and Abbe numbers, V, are for the 0.5893 micron Sodium line of the spectrum, the radii are numbered from $R_1$ to $R_{10}$, the thicknesses are numbered from $T_1$ to $T_5$, and the air spaces are numbered from $S_1$ to $S_4$.

4. A lens consisting of five elements, said elements being, from front to rear, a first positive meniscus element concave to the front, a second negative meniscus element concave to the front, a third positive biconvex element, a fourth negative biconcave element and a fifth positive meniscus element concave to the rear, wherein at least said first, second, fourth and fifth elements are made of plastic.

* * * * *

PO-1050
(5/69)

UNITED STATES PATENT OFFICE
CERTIFICATE OF CORRECTION

Patent No. __3,862,796__     Dated __January 28, 1975__

Inventor(s) __Donald DeJager__

It is certified that error appears in the above-identified patent and that said Letters Patent are hereby corrected as shown below:

Column 6, line 47    After "claim", delete "1" and substitute therefor --4--

Signed and sealed this 29th day of April 1975.

(SEAL)
Attest:

RUTH C. MASON
Attesting Officer

C. MARSHALL DANN
Commissioner of Patents
and Trademarks